Aug. 13, 1940.   E. R. WARNER   2,211,484
LANDING GEAR
Filed May 27, 1938   2 Sheets-Sheet 2
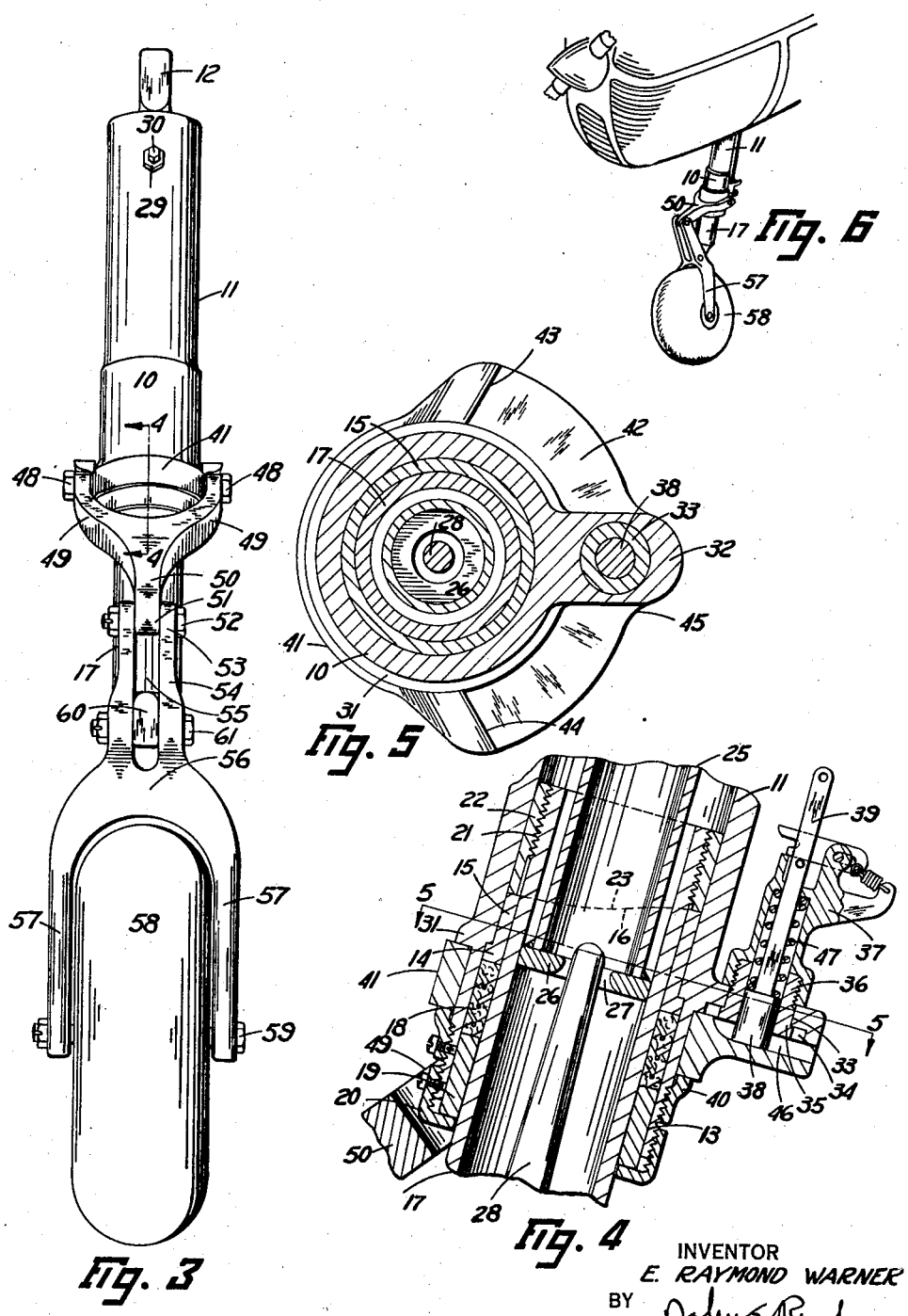
INVENTOR
E. RAYMOND WARNER
BY
ATTORNEY Patented Aug. 13, 1940

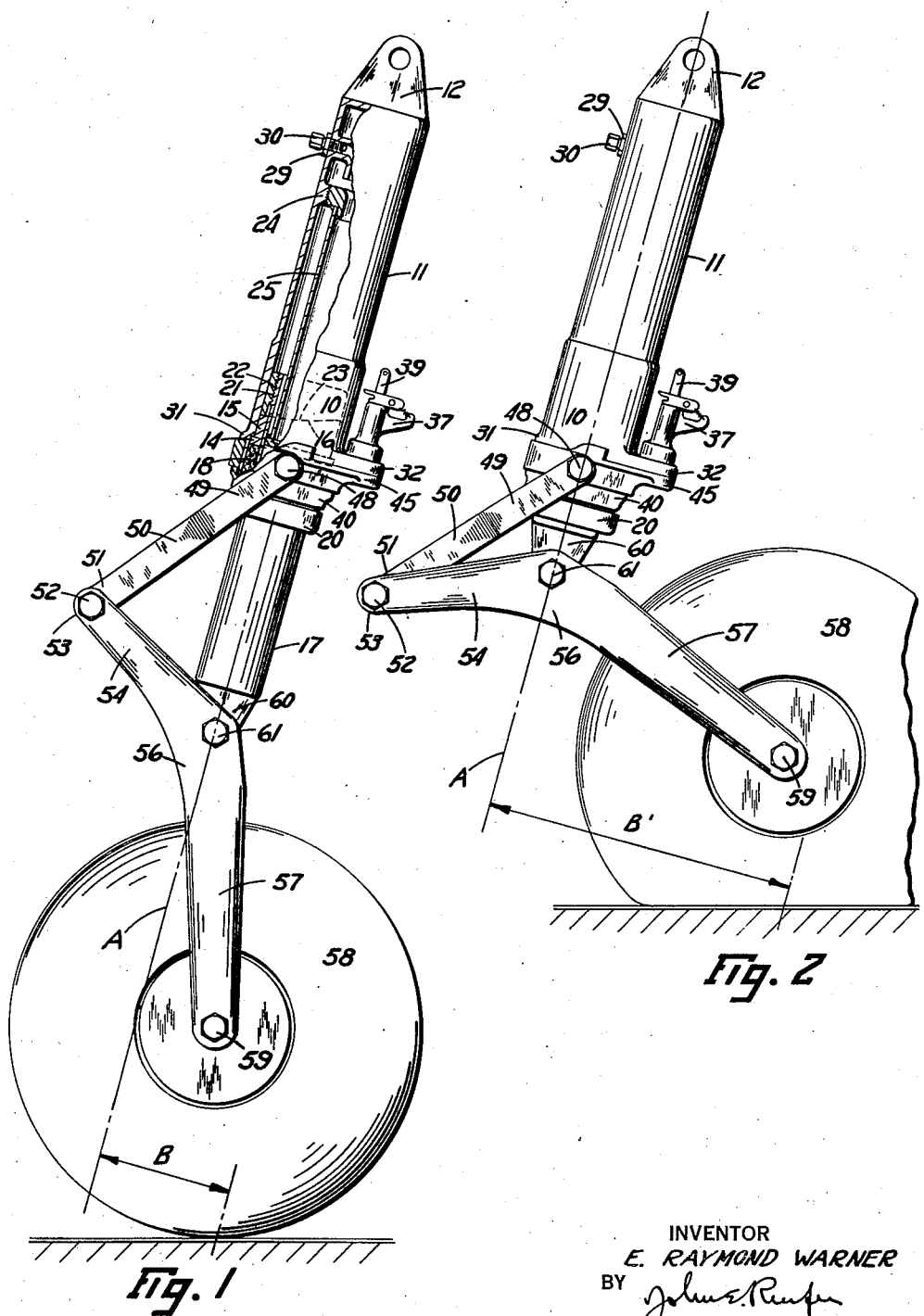

2,211,484

UNITED STATES PATENT OFFICE 2,211,484

LANDING GEAR

E. Raymond Warner, Cleveland, Ohio, assignor to The Cleveland Pneumatic Tool Company, Cleveland, Ohio, a corporation of Ohio Application May 27, 1938, Serial No. 210,486

7 Claims. (Cl. 244—104)

This invention relates broadly to aircraft, but more particularly to a new and improved landing gear for airplanes.

One object of this invention is to provide an airplane with shock absorbers interposed between the airplane proper and the landing wheels thereof for absorbing relative movement therebetween, the shock absorbers being connected to the landing wheels in a manner whereby the relative movement aforesaid is transmitted to the shock absorbers at a reduced rate of speed, thereby enabling a more gradual cushioning action of the shock absorbers resulting in better landing and taxiing qualities of the airplane.

Another object of this invention is to provide an airplane with a nose or tail wheel assembly of the caster type constructed and arranged in a manner whereby the trailing length of the wheel varies proportionally to the load to which the wheel is subjected, thereby causing the wheel to automatically assume a trailing position best suitable to reduce lateral oscillations or shimmy of the wheel.

A further object of this invention is the production of an airplane tail wheel including a connection through which the wheel base of the airplane, that is the distance between the main landing wheels and the tail wheel, may automatically be increased proportionally to the load carried by the tail wheel, thereby resulting in an airplane having landing and taxiing stabilities proportional to the load carried thereby.

A still further object of this invention is to provide an airplane with a shock absorber including telescopic cylinders, with a connection between the shock absorber and the landing wheel through which relative rotation of the cylinders is prevented.

Other objects and advantages more or less ancillary to the foregoing reside in the specific construction and aggroupment of the elements peculiar to this structure, as will become apparent from a more complete examination of this specification.

In the drawings:

Fig. 1 is a side elevational view partly in section of the wheel mounting shown in an extended position.

Fig. 2 is a view similar to Fig. 1 showing the wheel mounting in a contracted position.

Fig. 3 is a front elevational view of the wheel mounting shown in Fig. 1.

Fig. 4 is a portion of an enlarged longitudinal sectional view taken in a plane indicated by line 4—4 in Fig. 3.

Fig. 5 is a cross sectional view taken in a plane indicated by line 5—5 in Fig. 4.

Fig. 6 is a perspective view of the front lower portion of an airplane having the invention applied thereto and shown in the form of a nose wheel assembly.

Referring to the drawings in which like symbols designate corresponding parts throughout the several views, 10 represents generally a shock absorber including an outer cylinder 11 having its upper end closed and formed with a clevis 12 for attachment to the airplane. The lower end of the outer cylinder is opened and enlarged to form a counterbore 13 (Fig. 4) having the bottom thereof engaged by the annular flange 14 of a stationary bushing 15 which extends partway into the cylinder 11 and has its innermost end wall shaped as a cam 16.

Slidable and rotatable within the outer cylinder 11, there is an inner cylinder 17 extending through the bushing 15 which acts as a guiding bearing therefor, and through expansible packings 18 located within the counterbore 13 and held in position by a ring 19, which ring also acts as a bearing for the inner cylinder 17 and is held in position by a retaining nut 20 screwed on the extreme lower end of the outer cylinder 11. The inner or upper end of the inner cylinder 17 is threaded as at 21 to receive a piston 22 in slidable engagement with the outer cylinder, and having its lower end wall shaped as a cam 23 corresponding to the cam 16 of the bushing 15.

Near its upper end, the outer cylinder 11 is formed with an internal flange 24 having secured thereto a tube 25 depending therefrom and terminated near the open end of the outer cylinder 11 by a plate 26 for slidable engagement with the internal wall of the inner cylinder 17. This plate is provided with a central orifice 27 through which is free to slide a metering pin 28 carried by the inner cylinder 17 for slidable movement therewith.

Above the internal flange 24, the cylinder 11 is equipped with a filler plug 29 and an air valve 30 through which liquid and compressed air may be poured into the shock absorber 10, for absorbing relative movement between the cylinders 11 and 17.

The above description refers to a shock absorber well known in the art, the internal constructions of which are numerous and may differ from the one above described. It is to be understood that any shock absorber including two telescopically mounted cylinders similar to the cylinders 11 and 17 above referred to, may successfully be used in connection with the invention irrespective of the internal construction of the shock absorber.

Near its lower open end, the outer cylinder 11 is formed with a circumferential bead 31 having a lug 32 extending laterally therefrom and having an aperture 33 longitudinally therethrough, which aperture is countersunk on the underside of the lug as at 34 to receive the head 35 of an externally threaded bushing 36 extending through the lug and having screwed thereon a small housing 37. The head 35 of the bushing 36 is flush with the underside of the lug 32, while the housing 37 extends upwardly from the other side of the lug, and has mounted therein a locking mechanism similar to the one fully described in my pending patent application Serial No. 201,257, filed April 11, 1938, which mechanism includes briefly a plunger 38 slidable within the bushing 36 and having a stem 39 extending through the upper end of the housing 37. Rotatable on the outer cylinder 11 between the bead 31 and a retaining nut 40 screwed on the cylinder, there is a ring 41 formed with a partly circular flange 42 located below the lug 32 in sliding engagement therewith, and terminated by two vertical walls or stops 43 and 44. The central portion of the flange 42 is enlarged as at 45 to conform to the shape of the lug 32 and has the upper wall of this enlargement provided with a radial groove 46 adapted to receive the plunger 38, which plunger is constantly urged therein by a compression spring 47 carried by the housing 37.

At right angles from the groove 46, the ring 41 is provided with two diametrically opposed removable trunnions 48—48, through which the arms 49—49 of a yoke 50 are pivotally secured to the ring 41. The other end 51 of the yoke 50, hereinafter referred to as the inner end, while the free end of its arms 49—49 are referred to as the outer end of the yoke, is pivotally connected, through a shaft 52, to the inner end 53 of a shank 54, which shank is slotted as at 55 to receive the yoke 50 and forms an integral part of a fork 56. This fork has side arms 57—57 having a ground wheel 58 mounted between them for rotation on a shaft 59 carried by the free end of the side arms 57—57. The shank 54 is offset relative to the fork 56 forming, when viewed from the side as in Figs. 1 and 2, a substantially obtuse scalene triangle with the base thereof extending between the shafts 52 and 59.

The lower end of the inner cylinder 17 which always protrudes from the outer cylinder 11, is closed and formed with an integral tang 60 depending therefrom and extending into the slot 55 of the fork-shank 54, where it is pivotally connected to the fork 56 by a cross shaft 61. As viewed from the side, this last connection is located at the junction of the shank 54 with the fork 56, or substantially at the summit of the triangle above mentioned, with the shorter side of the triangle extending between the cross shafts 52 and 61. The fork 56, which is hereinafter also referred to as a lever or a wheel carrying member, may be said to include two branches, one extending from the shaft 61 to the shaft 59 and the other from the shaft 61 to the shaft 52. As viewed from the side as in Figs. 1 and 2, the yoke 50 and fork 56 may also be defined as a system of interconnected links or upper and lower legs through which the wheel 58 is connected to the shock absorber 10.

In practice, the wheel mounting above described may be used either as a nose wheel, a tail wheel, or be incorporated in the main landing gear of the airplane. In all instances, when the shock absorber 10 is fully extended, the length of the yoke 50 is calculated in a manner causing the centroid of the contact area of the wheel to the ground plane to be located to the rear of the center axis A of the shock absorber, thereby causing the wheel to trail in reference to the motion of the supported aircraft. In Fig. 1, the normal trailing length of the wheel 58 is represented by the distance B, which distance as hereinafter explained, increases proportionally with the load carried by the wheel.

Compression of the shock absorber such as resulting from the landing of the airplane, will enable pivotal movement of the fork 57 on the shaft 61, and the consequential upward movement of the wheel 58 relative to the shock absorber. Due to the length of the lever extending between the shafts 59 and 61, it will be understood that the movement of the inner cylinder 17 relative to the other cylinder 11 will result in an amplified movement of the wheel 58. In other words, due to the connecting mechanism including the yoke 50 and fork 56, the wheel 58 is caused to travel at a greater rate of speed than that of the inner cylinder 17 relative to the outer cylinder 11, thereby resulting in a more gradual and efficient action of the shock absorber than that heretofore possible with a wheel directly carried by the inner cylinder and movable upwardly therewith at the same rate of speed.

With the plunger 38 in the position shown in Fig. 4, that is located within the slot 46, the ring 41 is locked against rotation relative to the outer housing 11, thereby preventing rotation of the yoke 50 and fork 56, and maintaining the wheel 58 in a trailing position against lateral rotation. In this instance, the inner cylinder 17 need not be provided with splines, keys or the like interengaging similar means within the outer cylinder for preventing relative rotation between the two cylinders, because the yoke 50 and fork 56 actually act as torque resisting legs having their inner ends pivotally connected by the shaft 53 while the outer end of the upper torque leg 50, is pivotally connected to the outer cylinder, and the other leg, the fork 56, is pivotally connected intermediate the ends thereof to the outer end of the inner cylinder 17. This phase of the invention wherein the yoke 50 and fork 56 are used as torque resisting members between the wheel and its supporting member or shock absorber 10, is particularly adaptable for use in connection with the main landing wheels of the airplane, which wheels must necessarily be locked against lateral rotation in order to prevent lateral motion of the airplane when landing.

If the wheel mounting is to be used as a nose or tail wheel, the pilot may land and take-off with the plunger 38 still located within the groove 46, thereby preventing lateral rotation of the wheel, a feature which has been found advantageous especially when landing on or taking-off from a narrow field. When taxiing, to enable steering the airplane on the ground, it is necessary that the nose or tail wheel be free to rotate laterally. In this instance, through suitable controls described in my co-pending application above identified, the pilot may pull and maintain the plunger 38 out of the groove 46, thereby enabling free rotation of the ring 41 relative to the outer cylinder 11, and the consequential lateral rotation of the wheel 58 on the center axis A of its support 10. In the present construction, when the pin 38 is out of the groove 46, the wheel is free to swivel within an arc defined by the extend of the flange 42, or until the lug 34 engages the stops 43 or 44, which stops are spaced in a manner calculated to enable normal swivel movement of the wheel, but prevent it to take a position at right angles with the direction of motion of the airplane which would result in jars and vibrations transmitted to the plane due to the dragging of the wheel on the ground.

In the nose or tail wheel of the caster type just described, it will be understood that wheel 58, due to the pivotal connection 61, is still capable of vertical motion through which the trailing length B will increase proportionally to the compression of the shock absorber and consequently proportionally to the load to which the wheel is subjected. This trailing length may vary from the distance B in Fig. 1 when the shock absorber is fully extended, to the distance B' in Fig. 2 when the shock absorber is fully compressed. In practice, the increase of the trailing length of the wheel proportionally to the load of the wheel has been found to augment the stability of the wheel and materially reduce lateral oscillations or shimmy to which ordinary caster wheels are subjected.

When it is desired to lock the wheel before taking-off, the pilot may simply release the plunger 38. In this instance, the plunger 38 will ride the flange 42 until the wheel 58 is moved into central position, thereby enabling the plunger 38 to drop into the groove 46 for locking the wheel against lateral rotation. With the ring 41 locked against rotation, the yoke 50 and fork 56 actually act as torque legs resisting rotation of the inner cylinder 17 relative to the outer cylinder 11.

When the airplane is in the air the weight of the wheel 58 will gradually cause complete expansion of the shock absorber, which expansion is limited by the engagement of the piston 22 with the bushing 15. In this instance, if the wheel 58 has not been locked against lateral rotation before taking off, the cam 23 formed on the lower end wall of the piston 22 will cooperate with the stationary cam 16 of the bushing 15 for rotating the inner cylinder 17 and consequently the wheel 58 into central position wherein the plunger is free to drop into the groove 46 for locking the ring 41 and consequently the wheel 58 against lateral rotation.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A landing gear for airplanes comprising a shock absorber including a pair of telescoping cylinders one rotatable relative to the other, a ground wheel, means connecting said wheel to said shock absorber in a manner enabling pivotal movement of the wheel on two axes perpendicular to each other including a wheel carrying member pivotally connected to the rotatable cylinder, a ring rotatably carried by the other cylinder, and a link pivotally connecting said member to said ring.

2. A landing gear for airplanes comprising a shock absorber including a pair of telescoping cylinders one rotatable relative to the other, a ground wheel, connecting means between said shock absorber and wheel enabling pivotal movement of the latter on two axes perpendicular to each other including a wheel carrying member having two branches forming therebetween an obtuse angle, a pivotal connection between the junction of said branches and the outer end of the rotatable cylinder, a shaft on the free end of one of said branches having the wheel rotatable thereon, a ring rotatable on the other cylinder, and a link pivotally connecting the free end of the other branch to said ring.

3. In a landing gear for aircraft, a ground engaging member, a shock absorber between said member and the craft including two telescoping cylinders, rotation preventing means between said cylinders capable of release to enable relative rotation therebetween including means operatively connecting said member to said shock absorber, and means automatically rendering said rotation preventing means effective upon specific alignment of said cylinders about their center axis.

4. In a shock absorber, upper and lower telescoping cylinders capable of relative axial rotation, upper and lower pivotally interconnected torque legs hinged to said cylinders respectively for normally preventing said relative rotation, a releasable connection between one of said legs and its respective cylinder enabling said relative rotation, and means for automatically restoring said connection upon a specific alignment of said cylinders about the center axis thereof.

5. In a shock absorber for aircraft, a pair of telescoping cylinders one secured to the craft against rotation on its own axis and the other capable of said rotation, a ring carried by the non-rotatable cylinder, a rotation preventing lock between said last cylinder and ring capable of release to enable relative rotation therebetween, a pair of pivotally interconnected torque legs one hinged to the rotatable cylinder and the other to said ring, and spring means active on said lock for automatically effecting its operation upon a specific alignment of said cylinders about the center axis thereof.

6. In a shock absorber, upper and lower telescoping cylinders capable of relative axial rotation, upper and lower pivotally interconnected torque legs hinged to said cylinders respectively for normally preventing said relative rotation, a releasable connection between one of said legs and its respective cylinder enabling said relative rotation, means associated with said connection for limiting the extent of said relative rotation, and means for automatically restoring said connection upon a specific alignment of said cylinders about their center axis.

7. In a shock absorber for aircraft, a pair of telescoping cylinders one secured to the craft against rotation on its own axis and the other capable of said rotation, a pair of diametrically opposed trunnions carried by the non-rotatable cylinder, means for normally preventing said relative rotation including a pair of hinged torque legs one having its free end formed with laterally spaced arms pivotally mounted on said trunnions and the other leg being pivotally connected to said rotatable cylinder, a releasable connection between said trunnions and their carrying cylinder enabling rotation of said trunnions about the center axis of said last cylinder, and means automatically restoring said connection upon a predetermined alignment of said trunnions about the center axis of their carrying cylinder.

E. RAYMOND WARNER.